United States Patent

Bogut et al.

[15] 3,667,026
[45] May 30, 1972

[54] AUTOMATIC TEMPERATURE RESPONSIVE BATTERY CHARGING CIRCUIT

[72] Inventors: Henry A. Bogut; Leon Jasinski, both of Chicago, Ill.

[73] Assignee: Motorola, Inc., Franklin Park, Ill.

[22] Filed: Dec. 2, 1970

[21] Appl. No.: 94,261

[52] U.S. Cl. .................................................. 320/36, 320/39
[51] Int. Cl. ........................................................ H02j 7/04
[58] Field of Search ................................... 320/35, 36, 22, 39

[56] References Cited

UNITED STATES PATENTS

| 3,457,489 | 7/1969 | Gentry, Jr. et al. | 320/35 X |
| 3,534,241 | 10/1970 | Wilson et al. | 320/35 X |
| 3,531,706 | 9/1970 | Mullersman | 320/35 X |

*Primary Examiner*—J. D. Miller
*Assistant Examiner*—Robert J. Hickey
*Attorney*—Vincent J. Rauner and L. N. Arnold

[57] ABSTRACT

A charger for charging a battery at a first predetermined rate and automatically terminating said charge rate when the battery temperature rises, in response to the charging current, to a point indicating full charge. The battery has a thermistor mounted therein which changes resistance as the battery temperature changes.

The charger includes a charging circuit and silicon controlled rectifier in series with the battery. A sensing circuit, coupled to the thermistor, senses a thermistor resistance indicative of less than a full charge and changes from a first to a second state. If the thermistor resistance indicates a full charge, the sensing circuit changes from the second to the first state.

A switch circuit connected to the sensing circuit and the rectifier gate electrode is responsive to changes from the first to the second state to trigger the rectifier into conduction and allow charging of the battery at the predetermined rate. A latch circuit connected to the sensing circuit and rectifier gate electrode operates in response to the sensing circuit changing from the second to the first state to inhibit further conduction of the silicon controlled rectifier. The latch circuit is de-energized, allowing further conduction of the silicon controlled rectifier, by removal of the battery from the battery charger.

16 Claims, 1 Drawing Figure

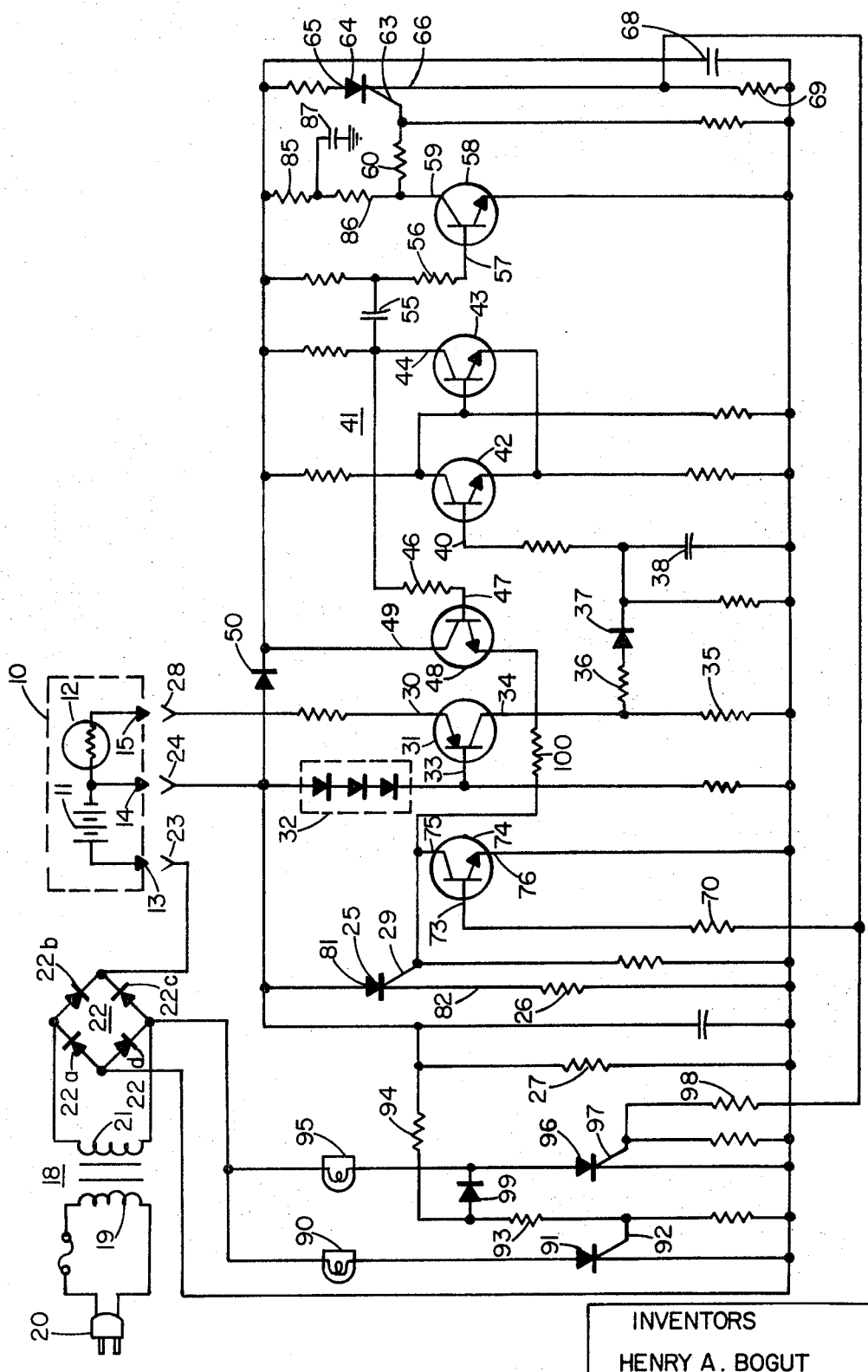

3,667,026

AUTOMATIC TEMPERATURE RESPONSIVE BATTERY CHARGING CIRCUIT

BACKGROUND OF THE INVENTION

One type of battery charger commonly employed for charging batteries senses the terminal voltage of the battery and provides a charging current to the battery until the terminal voltage rises to a point indicating the battery is fully charged. When such chargers are used to rapidly charge a battery, that is, provide a high charging current to the battery in order to recharge it in a short period of time, it has been found that they are not consistent in fully charging the batteries. This occurs because variations in battery resistance from unit to unit, and changes in battery resistance due to aging, temperature or various charging methods, can cause a change in the terminal voltage to which the battery must be charged. If the terminal voltage increases, the charger will not supply enough current to charge the battery to the desired voltage. If the terminal voltage decreases, the charger will overcharge the battery if it is charged to the terminal voltage. Overcharging a sealed battery can damage the battery thus reducing its useful life, and can also cause overheating and gassing, creating the possibility of an explosion.

It has been found that a battery may be charged at a high charging current or rate to substantially 100 percent of its charge capacity by measuring the temperature rise in the battery as it is being charged. This temperature rise is directly related to the condition of charge of the battery, and will remain so related even though other physical characteristics of the battery may change or deteriorate.

Although charging systems which measure battery temperature rise have been previously employed, all required some manual settings to the system in order to initiate or terminate charging. The systems are commonly used with vented rather than sealed cells, and require manual attachment of the temperature sensing components and charging circuits. Those that automatically initiate charging are so designed as to continuously provide a dangerous high voltage or high current at the exposed charging terminals. Such systems are primarily designed for charging batteries, such as automobile batteries, where large and expensive mechanisms can be employed, and are operated by trained personnel. In an application where it is necessary to charge a great many portable radio batteries, and the batteries are connected by untrained personnel, a small inexpensive and highly automated unit is desirable. It is also desirable that the system employ no mechanical or electromechanical switching components, thus minimizing adjustment and maintenance.

SUMMARY OF THE INVENTION

An object of this invention is to provide an automatic battery charger capable of charging all batteries of the same type to substantially 100 percent of full charge capacity.

Another object of this invention is to provide an automatic battery charger which employs no relays or mechanical switches.

Yet another object of this invention is to provide an automatic battery charger which senses the temperature rise in the battery due to charging current, terminates charging when a temperature indicating full charge has been reached, and inhibits further charging.

Still another object of this invention is to provide an automatic charger which is reset, allowing it to again charge, by removing or disconnecting the battery from the charger.

A further object of this invention is to provide an automatic battery charger wherein the exposed charging terminals do not carry a dangerous high current until the battery has been connected thereto.

In practicing this invention a charger is provided for automatically rapidly charging a battery at a predetermined charging rate, and automatically terminating said charging rate when the battery temperature rises, in response to charging current, to a point indicating full charge. The battery includes a thermistor which changes resistance as the temperature of the battery varies.

The charger includes a charging circuit and silicon controlled rectifier in series with the battery. When the battery is connected to the charger, a bias circuit is coupled to the thermistor which develops a voltage in response to the current through the thermistor that varies in accordance with the temperature, and therefore state of charge, of the battery. A trigger circuit is coupled to the bias circuit and is responsive to the voltage developed thereby, indicative of less than full charge, to change from a first to a second state. The trigger circuit is also responsive to a bias voltage indicating full charge to change from the second to the first state.

A first switching circuit connected to the trigger circuit is responsive to the change from the first to the second state to render the silicon controlled rectifier in series with the battery conductive, allowing the battery to charge at the predetermined rate. A turn-off circuit connected to the trigger circuit and the silicon controlled rectifier is responsive to the change from the second to the first state to render the silicon controlled rectifier in series with the battery non-conductive, and inhibit further conduction. The turn-off circuit is reset allowing further conduction of the silicon controlled rectifier when the battery is removed from the charging device.

Contacts on the battery housing and contacts in the charger mate when the battery is inserted into the charger automatically providing all necessary interconnections. This allows the charger to be used by untrained personnel. As the bias circuit will not be operative until the battery is inserted into the charger, the silicon controlled rectifier will by non-conductive. When the silicon controlled rectifier is non-conductive, a high current charging path is not provided for charging the battery. The exposed charging terminals of the battery charger do not therefore carry a dangerous high current or voltage when the battery is not in the charger. When the battery is inserted, it covers the terminals preventing accidental contact by untrained personnel.

THE DRAWING

The single FIGURE is a schematic diagram of an automatic rapid charger circuit incorporating the features of this invention, and the battery which is charged by the charger and which has a thermistor mounted therein.

DESCRIPTION OF THE PREFERRED EMBODIMENT

Referring now to the drawing there is shown a schematic diagram of an automatic battery charger circuit incorporating the features of this invention. A battery unit 10 which is to be charged is shown along with the charger circuitry. Battery unit 10 includes a battery 11, and a thermistor 12.

Battery 11 is of the rechargeable type and may or may not be sealed. The temperature of a rechargeable battery such as battery 11 rises, in response to an applied charging current, as the battery approaches full charge. This rising temperature characteristic remains consistent even when the battery is charged at an extremely high charging rate. It remains substantially the same for all batteries of a given type and configuration, notwithstanding variations in battery resistance, or terminal voltage, or variations due to aging and various charging rates. For this reason, measurement of the temperature rise in a battery is the most precise method of monitoring state of charge of a battery.

Thermistor 12 is physically mounted within the housing of unit 10 and is responsive to a change in battery temperature to change resistance. Thermistor 12 is a positive temperature coefficient thermistor selected such that its resistance will substantially increase at a temperature corresponding to a battery temperature indicative of full charge on the battery.

Battery unit 10 includes contacts 13, 14 and 15. Contacts 13 and 14 are each connected to one terminal of battery 11. Terminal 15 is connected to one end of thermistor 12. The other end of thermistor 12 is connected to terminal 14 and its associated battery terminal. As can be seen, battery 11 and thermistor 12 are connected in series between terminals 13 and 15. Contacts 13, 14 and 15 are physically secured to one surface of battery unit 10 such that when the battery is inserted into the charger the contacts will mate with the corresponding contacts mounted on the charger. The weight of the battery unit 10 when the unit is inserted into the charger will insure an adequate connection between the charger contacts and battery contacts. Battery unit 10 will cover the charger contacts when inserted, preventing accidental contact by untrained personnel who may use the device.

The automatic battery charger circuit includes a transformer 18 having a primary winding 19 supplied from a commercial alternating current source by plug 20. Secondary winding 21 of transformer 18 is connected to bridge rectifier 22, having diodes 22a, b, c and d connected in the respective legs of the bridge network in conventional fashion. The junction of diodes 22b and 22c is connected to terminal 23. Terminal 23 provides one contact terminal for connection of the charger to battery unit 10. Terminal 24 of the charger couples terminal 14 of battery unit 10 to the charger circuit. A silicon controlled rectifier (SCR) 25, has one principal electrode 81 coupled to terminal 24, and a second principal electrode 82 coupled to resistor 26. Resistor 26 is coupled to the junction of diodes 22a and 22d in bridge rectifier 22 to complete a series fast charging path for battery 11 in battery unit 10. Coupled in parallel with SCR 25 and resistor 26 is resistor 27, a high resistance which provides a slow charge, or trickle charge path for battery 11 when unit 10 is installed in the charger.

Operation of the charger circuit is as follows; Battery unit 10 is inserted into the charger housing making contact with contacts 23, 24 and 28. Thermistor 12 in battery unit 10, being a positive temperature coefficient thermistor, initially has relatively low resistance, allowing current to flow therethrough to emitter 30 of transistor 31. Transistor 31 is biased into conduction by the bias voltage supplied by bridge rectifier 22 and battery 11 through contacts 14 and 24, and diodes 32, to base 33 of transistor 31. Transistor 31 acts to amplify the current flowing through thermistor 12. The amplified current appears at collector 34 causing a voltage to be developed across resistor 35. The voltage developed across resistor 35 is coupled through resistor 36 to diode 37 and capacitor 38 where it is filtered to produce a DC voltage that varies in accordance with the current through thermistor 12. This voltage is coupled to base 40 of transistor 42 in Schmitt trigger 41. As the current passing through thermistor 12 varies in accordance with the temperature of the battery, the voltage developed at base 40 of Schmitt trigger 41 also must vary in accordance with the temperature of the battery.

Schmitt trigger 41 consists of transistors 42 and 43, with transistor 42 being normally non-conductive and transistor 43 conductive. The voltage developed at base 40 of transistor 42, when thermistor 12 has a relatively low resistance, is sufficient to cause Schmitt trigger 41 to change states. That is, transistor 42 will saturate. When transistor 42 saturates, it causes transistor 43, the other half of Schmitt trigger 41, to become non-conductive, causing the voltage at collector 44 of transistor 43 to increase or go to a more positive logic level. Schmitt trigger 41 has now changed from a first to a second state. The increased voltage at collector 44 is coupled through resistor 46 to base 47 of transistor switch 48. Transistor 48 has collector 49 connected to a source of DC potential at diode 50. Emitter 51 of transistor 48 is coupled to gate 29 of SCR 25 through resistor 100. The increased voltage coupled to base 47 of transistor 48 forward biases transistor 48, coupling the DC voltage from collector 49 through emitter 51 and resistor 100 to gate 29 of SCR 25. The DC voltage coupled to gate 29 causes SCR 25 to conduct and provide a high current charging path for battery 11. The current through this high current charging path is limited by resistor 26.

As battery 11 approaches full charge, its temperature rises due to the high charging current. As previously stated, this temperature rise causes the resistance of thermistor 12 to substantially increase. With the resistance of thermistor 12 substantially increased, the current coupled to amplifier transistor 31, and the voltage developed across resistor 35 will decrease. The rectified voltage then coupled to base 40 of transistor 42 will also decrease to a point which causes transistor 42 to become non-conductive. When transistor 42 of Schmitt trigger 41 becomes non-conductive, transistor 43 will again begin to conduct, causing the voltage at collector 44 of transistor 43 to suddenly decrease. Schmitt trigger 41 has now changed from the second back to the first state. The negative going change in voltage at collector 44 of transistor 43 is coupled through capacitor 55 and resistor 56 to base 57 of transistor 58. Transistor 58 is rendered temporarily non-conductive by the negative going voltage or pulse, causing collector 59 to temporarily increase in voltage and become more positive. This temporarily increased positive voltage or pulse is coupled through resistor 60 to gate 63 of SCR 64, causing SCR 64 to conduct. Diode 50 coupled to terminal 24, and capacitor 68 coupled to the cathode of diode 50 act to rectify the voltage coupled from rectifier bridge 22 and battery 11, and produce a pure DC signal at anode 65 of SCR 64. With a pure DC signal at anode 65, SCR 64 will continue conducting until the DC voltage at anode 65 is removed. When SCR 64 conducts, a voltage is developed across resistor 69 coupled between cathode 66 of SCR 64 and ground potential. This voltage is coupled through resistor 70 to base 73 of transistor 74, causing transistor 74 to conduct. With transistor 74 conducting, collector 75 of transistor 74 approaches the ground potential at emitter 76. Collector 75 is coupled to gate 29 of SCR 25. With a ground potential at gate 29, caused by the ground potential at collector 75 of transistor 74, SCR 25 will be rendered non-conductive when the potential at anode 81 of SCR 25 drops to 0 volts. This occurs when the rectified DC pulses, coupled through battery 11 from rectifier network 22 drop to 0 volts. With SCR 25 cut-off, the rapid charging path is broken, allowing battery 11 to be maintained in a charged condition through the charging path provided by slow, or trickle charge resistor 27.

When the rapid charging has terminated, battery unit 10 will begin to cool to room temperature due to the elimination of the high charging current. As the battery temperature decreases, the resistance of thermistor 12 will decrease, again allowing more current to be coupled through amplifier 31 to resistor 35. The rectified voltage coupled to base 40 of Schmitt trigger 41 will increase causing the Schmitt trigger to again change states, or change from a first to a second state. The change of state causes collector 44 of transistor 43 to again increase. The increased voltage is coupled to transistor 48 causing it to conduct and couple the DC voltage from collector 49 to emitter 51. Although emitter 51 is coupled to gate electrode 29 of SCR 25, it will not cause conduction of SCR 25. This is because transistor 74 remains conductive, acting as a switch to shunt any voltage appearing at gate 29 of SCR 25 to ground, and preventing energization of SCR 25. Transistor 74 will remain conductive as long as SCR 64 remains conductive. SCR 64 will remain conductive as long as battery unit 11 is connected to the charger. When battery unit 11 is removed from the charger, the DC potential coupled from terminal 14 through rectifier 50 to anode 65 of SCR 64 is removed, causing SCR 64 to stop conducting. With SCR 64 rendered non-conductive, transistor 74 no longer provides a ground path for gate 29 of SCR 25, allowing SCR 25 to conduct when a positive voltage is coupled to gate 29.

The network consisting of resistors 85 and 86, and capacitor 87 acts as a delay network, preventing the voltage at gate 63 of SCR 64 from building up before the voltage at anode 65. With this delay network, insertion of a battery or connection of the AC plug 20 to a source of AC potential, will not cause SCR 64 to fire and inhibit operation of the fast charging circuit.

As previously stated, transistor 31 is biased into conduction by bias voltage supplied by bridge rectifier 22 and battery 11. It will not be rendered conductive unless the proper combined voltage is supplied to terminals, 24 and 28, and the proper resistance is coupled thereacross. A human hand, or a metallic object shorting terminals 23, 24 and 25 together, will not forward bias transistor 31. Conduction of amplifier 31 is necessary before SCR 25, which completes the high current charging path, can be rendered conductive. The high current charging path cannot therefore be rendered operative when battery unit 10 is removed and the charging terminals are exposed. The voltage developed at terminal 23 by bridge circuit 22, is low and will not be harmful if a person should accidentally short same to terminal 24 or 28. Although a current path is still provided by resistor 27, the resistance value is high, preventing a dangerous amount of current from flowing therethrough.

The automatic rapid charger circuit also includes indicating means to indicate when the unit is being charged, or that rapid charge has been completed. The first indicating circuit consists of indicator light 90 and SCR 91, series connected from the junction of rectifiers 22c and 22d to the junction of rectifiers 22a and 22d. Gate 92 of SCR 91 is connected through resistors 93 and 94 to terminal 24 of the automatic charger unit. When battery unit 10 is installed in or connected to the charger, SCR 91 will be rendered conductive, causing light 90 to illuminate indicating the unit 10 is charging.

A second indicating circuit is included to show charge completion. The circuit includes lamp 95 and SCR 96 connected in parallel with lamp 90 and SCR 91. Gate 97 of SCR 96 is coupled through resistor 98 to cathode 66 of SCR 64. When SCR 64 conducts, the voltage developed across resistor 69 is also coupled to gate electrode 97 of SCR 96, causing it to conduct allowing illumination of lamp 95. Lamp 95 indicates that charging is completed. The conduction of SCR 96 also forward biases diode 99 coupled from the junction of lamp 95 and SCR 96 to the junction of resistors 93 and 94. With diode 99 forward biased, the voltage developed at gate 92 or SCR 91 decreases, causing SCR 91 to become non-conductive between the next rectified DC line pulse.

As can be seen, an automatic battery charger circuit has been provided for rapidly charging a rechargeable battery to substantially 100 percent of its full charge capacity. The automatic battery charger employs no mechanical switches or relays in order to initiate or terminate charging. The charger senses the temperature rise in the battery due to charging current, terminates charging when a temperature indicating full charge has been reached, and inhibits further charging. The charger is so designed that the exposed charging terminals do not carry a dangerous high current until the battery has been connected thereto. The simple and fully automated circuit operation of the charger allows it to be conveniently used by untrained personnel.

What is claimed is:

1. A device for charging a battery from a source of alternating current wherein the battery includes a temperature variable resistor in series with the battery which changes resistance and current therethrough as the battery temperature changes in response to charging current, said device including in combination, a charging circuit including rectifier means coupled to the source of alternating current and to the battery for applying a unidirectional charging current to said battery, a first silicon controlled rectifier including a pair of principal electrodes in series with the battery and said charging circuit for passing said unidirectional charging current to allow charging of said battery, said first silicon controlled rectifier having a gate electrode for controlling conduction thereof, first circuit means coupled to said temperature variable resistor and responsive to the current therethrough to develop a first voltage varying in level in accordance with the temperature of said battery, semiconductor trigger circuit means coupled to said first circuit means and responsive to said first voltage exceeding a first predetermined level to change from a first to a second state and responsive to said first voltage decreasing below said predetermined level to change from the second to first state, first switch means coupled to said semiconductor trigger circuit means and said gate electrode for triggering said first rectifier into conduction by said change of state whereby said battery is allowed to charge, and turn-off circuit means coupled to said semiconductor trigger circuit means and said gate electrode and responsive to said trigger circuit means changing from said second to said first state to trigger said first rectifier into non-conduction whereby said battery is no longer charged.

2. The device of claim 1 wherein said first switch means includes, a first transistor coupled to said rectifier gate electrode and to said semiconductor trigger circuit means and responsive to the change from the first to the second state to trigger said first rectifier into conduction.

3. The device of claim 2 wherein said turn-off circuit means includes, a second silicon controlled rectifier having a gate electrode coupled to said semiconductor trigger circuit means and a principal electrode coupled to the battery, said second rectifier being rendered conductive in response to said semiconductor trigger circuit changing from the second to the first state, said first rectifier being rendered non-conductive and further conduction thereof inhibited, in response to said second rectifier conduction, said second rectifier being rendered non-conductive by removal of said battery from said device whereby said first rectifier may be rendered conductive in response to said first switch means.

4. The device of claim 3 wherein said turn-off circuit further includes, a second transistor coupled to said first rectifier gate electrode and to a principal electrode of said second rectifier, said second transistor operative in response to conduction of said second rectifier to render said first rectifier non-conductive and inhibit further conduction of same.

5. The device of claim 4 wherein said turn-off circuit means further includes, a third transistor coupled to said second rectifier gate electrode and to said semiconductor trigger circuit means, said third transistor operative in response to said trigger circuit means changing from the second to the first state to trigger said second rectifier into conduction.

6. The device of claim 5 wherein said semiconductor trigger circuit means is a Schmitt trigger.

7. The device of claim 6 further including, indicator circuit means coupled to said charging circuit and to said battery and responsive to the charging current flowing therethrough to indicate charging of said battery.

8. The device of claim 7 further including second indicator circuit means coupled to said charging circuit and to said second rectifier and responsive to conduction of said second rectifier to indicate completion of charging.

9. The device of claim 8 wherein said first and second indicator circuit means includes, a lamp coupled to said charging circuit for providing said indication, and a silicon controlled rectifier having first and second principal electrodes in series with said lamp and charging circuit, said silicon controlled rectifiers each including a gate electrode for controlling conduction thereof, said rectifier gate electrode in said first indicating means being coupled to said battery and responsive to charging current flowing therethrough to render said rectifier conductive, said rectifier gate electrode in said second indicating means being coupled to said second rectifier and responsive to conduction thereof to render said rectifier conductive.

10. A device for automatically charging a battery having a voltage thereacross from a source of alternating current at a predetermined charge rate and automatically terminating said charge rate when the battery temperature rises to a first level indicating full charge, in response to the charging current, and wherein the device is reset by removal of the battery from the device, said device including in combination, a charging circuit including rectifier means series coupled with said battery and coupled to said source of alternating current for applying a unidirectional charging current to said battery, a first silicon controlled rectifier having a pair of principal electrodes in series with said battery and said charging circuit for passing said undirectional charging current to allow charging of said battery, said first rectifier having a first gate electrode for controlling conduction thereof, first circuit means coupled to said battery and responsive to a battery temperature below said first level to switch from a first to a second state, said first circuit means responsive to a battery temperature above said first level to switch from the second to the first state, first switch means connected to said first circuit means and the first rectifier gate electrode and responsive to a change from the first to the second state to develop a trigger signal, said first rectifier operative only in response to said trigger signal to conduct whereby said battery is allowed to charge, latch circuit means coupled to said first circuit means and said first rectifier gate electrode and including a second silicon controlled rectifier having a first principal electrode coupled to the battery and a gate electrode coupled to said first circuit means, said second rectifier being rendered conductive in response to said first circuit changing from the second to the first state, and further being held conductive by said battery voltage coupled thereto, said first rectifier being rendered non-conductive and further conduction of same inhibited in response to said second rectifier conduction, said second rectifier being rendered non-conductive by termination of said battery voltage coupled thereto, termination of said battery voltage being effected only by removal of said battery from said device.

11. The device of claim 10 wherein said battery further includes, a temperature variable resistor mounted therein in series with the battery which changes resistance and current therethrough as the battery temperature varies, and said first circuit means includes, bias circuit means coupled to said temperature variable resistor and responsive to the current therethrough to develop a bias voltage varying in accordance with the temperature of said battery, said first circuit means further including semiconductor trigger circuit means coupled to said bias circuit means and responsive to said bias voltage exceeding a first predetermined level to change from the first to the second state, said trigger circuit means being further responsive to said first voltage decreasing below said first predetermined level to change from the second to the first state.

12. The device of claim 11 wherein said first switch means includes, a first transistor coupled to said semiconductor trigger circuit means, and to said first rectifier gate electrode, said first transistor being responsive to said trigger circuit means changing from the first to the second state to trigger said first rectifier into conduction.

13. The device of claim 12 wherein said latch circuit means further includes, second switch means coupled to said first rectifier gate electrode and to a second principal electrode of said second rectifier, and operative in response to conduction of said second rectifier to render said first rectifier non-conductive and inhibit further conduction of same.

14. The device of claim 13 wherein said latch circuit means further includes, a third switch means coupled to said second rectifier gate electrode and said trigger circuit means, said third switch means operative in response to said trigger circuit changing from the second to the first state to trigger said second rectifier into conduction.

15. The device of claim 11 wherein said semiconductor trigger circuit means is a Schmitt trigger.

16. The device of claim 15 wherein said second and third switch means are transistors.

* * * * *